(12) United States Patent
Easler et al.

(10) Patent No.: US 7,700,202 B2
(45) Date of Patent: Apr. 20, 2010

(54) PRECURSOR FORMULATION OF A SILICON CARBIDE MATERIAL

(75) Inventors: Timothy E. Easler, San Diego, CA (US); Andrew Szweda, San Deigo, CA (US); Eric Stein, Poway, CA (US)

(73) Assignee: Alliant Techsystems Inc., Minneapolis, MN (US)

( * ) Notice: Subject to any disclaimer, the term of this patent is extended or adjusted under 35 U.S.C. 154(b) by 259 days.

(21) Appl. No.: 11/357,716

(22) Filed: Feb. 16, 2006

(65) Prior Publication Data

US 2007/0189952 A1 Aug. 16, 2007

(51) Int. Cl.
*B32B 9/00* (2006.01)
*B32B 19/00* (2006.01)
*C04B 35/52* (2006.01)
*C04B 35/56* (2006.01)

(52) U.S. Cl. .......................... 428/698; 376/904; 501/88
(58) Field of Classification Search .................. 428/698; 501/92, 96.3, 96.4
See application file for complete search history.

(56) References Cited

U.S. PATENT DOCUMENTS

| | | | | |
|---|---|---|---|---|
| 3,801,447 | A * | 4/1974 | Heenan ........................ | 376/456 |
| 4,004,934 | A * | 1/1977 | Prochazka .................... | 501/90 |
| 4,663,105 | A | 5/1987 | Sakai et al. | |
| 4,744,922 | A * | 5/1988 | Blakely et al. ............... | 252/478 |
| 5,071,600 | A | 12/1991 | Deleeuw et al. | |
| 5,366,943 | A | 11/1994 | Lipowitz et al. | |
| 5,395,783 | A * | 3/1995 | Baumann et al. ............ | 438/239 |
| 5,851,942 | A | 12/1998 | Sacks et al. | |
| 6,261,509 | B1 | 7/2001 | Barnard et al. | |
| 2005/0205798 | A1 * | 9/2005 | Downing et al. ........ | 250/390.11 |

FOREIGN PATENT DOCUMENTS

JP 2000-155189 * 11/1999

OTHER PUBLICATIONS

Pramono et al. ("Helium Release and Physical property Change of Neutron Irradiated alpha-SiC Containing B4C of Different 10B concentrations"), Journal of Nuclear Science and Technology. vol. 40, No. 7, p. 531-536 (Jul. 2003).*

Phelps et al. ("Step Bunching Fabrication Constraints in Silicon Carbide"). Semiconductor Science and Technology. vol. 17, No. 5, (May 2002) pp. L17-L21.*

"New High-Performance SiC Fiber Developed for Ceramic Composites," <<http://www.lerc.nasa.gov/WWW/RT2001/5000/5100dicarlo1.html>> 2001, 3 pages.

(Continued)

*Primary Examiner*—Timothy M Speer
*Assistant Examiner*—Jonathan C Langman
(74) *Attorney, Agent, or Firm*—TraskBritt (57) ABSTRACT

A precursor formulation of a silicon carbide material that includes a ceramic material and a boron-11 compound. The ceramic material may include silicon and carbon and, optionally, oxygen, nitrogen, titanium, zirconium, aluminum, or mixtures thereof. The boron-11 compound may be a boron-11 isotope of boron oxide, boron hydride, boron hydroxide, boron carbide, boron nitride, boron trichloride, boron trifluoride, boron metal, or mixtures thereof. A material for use in a nuclear reactor component is also disclosed, as are such components, as well as a method of producing the material.

8 Claims, 3 Drawing Sheets

OTHER PUBLICATIONS

Certificate of Analysis and Conformance, Enriched Boron Oxide (11B2O3), EaglePicher Technologies, LLC., Quapaw, OK, Mar. 17, 2005, 2 pages.

Ceradyne, Inc. Completes EaglePicher Boron LLC Acquisition, Ceradyne, Inc. New Release, Sep. 4, 2007, http://www.ceradyne.com/news/newsreleasedetails.aspx?id=154, printed Jun. 3, 2009, 2 pages.

(11)B Enriched Boron Oxide Product Specification, Ceradyne, Inc., Document No. BP-SSSm-11B03, Feb. 21, 2008, 1 page.

* cited by examiner

PRECURSOR FORMULATION OF A SILICON CARBIDE MATERIAL

FIELD OF THE INVENTION

The present invention relates to a stable silicon carbide ("SiC") material for use in the nuclear industry, such as in components of a nuclear reactor, as well as to such components. More specifically, the present invention relates to a SiC material that includes a boron-11 ("$^{11}$B") isotope, as well as to a precursor and method for forming the SiC material, and components including the SiC material.

BACKGROUND OF THE INVENTION

SiC fibers are known in the art for providing mechanical strength at high temperatures to fibrous products, such as high temperature insulation, belting, gaskets, or curtains, or as reinforcements in plastic, ceramic, or metal matrices of high performance composite materials. To provide good mechanical strength to these products or materials, the SiC fibers have a relatively high density (i.e., low residual porosity) and fine grain sizes. However, producing SiC fibers with these properties is difficult because the SiC fibers typically undergo coarsening or growth of crystallites and pores during a high-temperature heat treatment.

Sintering aids have been used to improve densification of the SiC fibers and to prevent coarsening, allowing the SiC fibers to be fabricated with high density and fine grain sizes. These sintering aids are typically compounds of boron. As disclosed in U.S. Pat. No. 5,366,943 to Lipowitz et al., which is incorporated by reference in its entirety herein, the SiC fibers are formed by converting amorphous ceramic fibers to polycrystalline SiC fibers. The ceramic fibers are heated in the presence of a sintering aid to produce the polycrystalline SiC fibers. The sintering aid is boron or a boron-containing compound, such as a boron oxide ("$B_2O_3$"). An example of SiC fibers prepared by this process is SYLRAMIC®, which is available from COI Ceramics, Inc. (San Diego, Calif., an affiliate of ATK Space Systems).

Another method of forming SiC fibers is by spinning a polycarbosilane resin into green fibers, treating the green fibers with boron, and curing and pyrolyzing the green fibers, as disclosed in U.S. Pat. No. 5,071,600 to Deleeuw et al. Other methods of forming SiC fibers are known, such as spinning organosilicon polymers into fibers, curing the fibers, and ceramifying the fibers at elevated temperatures. However, many of these methods undesirably introduce oxygen or nitrogen into the SiC fibers. When these SiC fibers are heated to temperatures above 1400° C., the oxygen or nitrogen is volatilized, causing weight loss, porosity, and decreased tensile strength in the SiC fibers. In addition to SiC fibers, SiC bodies are known to be formed by molding SiC powder and elemental carbon into a desired shape and heating the molded structure in a boron-containing environment.

While many methods of producing SiC fibers (or SiC bodies) are known, components or products formed from conventional SiC fibers, such as those described above, are not suitable for use in nuclear applications due to the boron compound used as the sintering aid. The boron compound typically includes boron-10 ("$^{10}$B"). Boron has thirteen isotopes, two of which, $^{10}$B and $^{11}$B, are naturally occurring. The natural abundance of $^{10}$B and $^{11}$B is 19.9% and 80.1%, respectively. However, $^{10}$B is the most commercially available isotope because $^{10}$B is more easily extracted from ore than $^{11}$B. $^{10}$B absorbs neutrons and is used in control rods of nuclear reactors, as a shield against nuclear radiation, and in instruments for detecting neutrons. However, $^{10}$B is unstable and undergoes fission when irradiated, producing a gamma ray, an alpha particle, and a lithium ion. Therefore, when a component formed from conventional SiC fibers is irradiated, the boron compound undergoes fission, which is accompanied by outgassing and degradation of the SiC fibers or the SiC bodies. As such, conventional SiC fibers are not suitable for use in a component to be used in the nuclear industry, such as in a nuclear reactor.

It would be desirable to produce SiC fibers or SiC bodies that are more stable to irradiation for use in components to be used in the nuclear industry. For instance, it would be desirable to produce SiC fibers or SiC bodies that are useful in nuclear applications without outgassing or degradation.

BRIEF SUMMARY OF THE INVENTION

The present invention relates to a precursor formulation of a SiC material that includes a ceramic material and a boron-11 compound. As used herein, the term "SiC material" refers to SiC fibers, SiC bodies, or other forms of SiC ceramics, such as monolithic SiC, SiC coatings, SiC thin substrates, or porous SiC ceramics. The ceramic material may include silicon and carbon and, optionally, oxygen, nitrogen, titanium, aluminum, zirconium, or mixtures thereof. For the sake of example only, the ceramic material may include SiC fibers, silicon oxycarbide fibers, silicon carbon nitride fibers, silicon oxycarbonitride fibers, polytitanocarbosilane fibers, or mixtures thereof. The boron-11 compound may be a boron-11 isotope of boron oxide, boron hydride, boron hydroxide, boron carbide, boron nitride, boron trichloride, boron trifluoride, boron metal, or mixtures thereof. The boron-11 compound may account for less than or equal to approximately 2% by weight ("wt %") of a total weight of the precursor formulation. Thus, while the present invention is referred to for the sake of convenience in the singular as "a" precursor and "a" SiC material, it will be appreciated that a number of different SiC materials and precursors that may be used to form a variety of materials are encompassed by the present invention.

The present invention also relates to a material for use in a nuclear reactor component. The material includes a SiC material and a boron-11 compound. The SiC material may be SiC fibers, a SiC body, a SiC ceramic, a SiC coating, a SiC thin substrate, or a porous SiC ceramic. The boron-11 compound may be one of the compounds previously described. The boron-11 compound may account for from approximately 0.1 wt % of a total weight of the material to approximately 4 wt % of the total weight of the material. A layer of boron nitride that includes the $^{11}$B isotope ("$^{11}$BN") may, optionally, be present on a surface of the material.

The present invention also relates to a method of producing a SiC material by converting a ceramic material to a SiC material in the presence of a boron-11 compound. The ceramic material may be converted by heating the ceramic material in an environment that includes the boron-11 compound. The ceramic material and the boron-11 compound may include one of the compounds previously described. Alternatively, the boron-11 compound may be formed by reacting a boron-11 containing material with an oxidizing agent in situ. The boron-11 containing material may be selected from the group consisting of boron carbide, boron, boron suboxide, and mixtures thereof and the oxidizing agent may be selected from the group consisting of carbon dioxide, carbon monoxide, oxygen, and mixtures thereof. As with the precursor and material of the present invention, the method may be varied within the scope of the invention.

The ceramic material and the boron-11 compound may be heated to a temperature that is greater than approximately 1200° C., such as from approximately 1200° C. to approximately 1400° C., for an amount of time sufficient for the boron-11 compound to vaporize and diffuse into the ceramic material and for volatile by-products to be released. The silicon carbide material may, optionally, be exposed to a nitrogen atmosphere to form a layer of $^{11}$BN on a surface of the silicon carbide material.

The present invention also encompasses structures formed at least in part of a material including an SiC material and a boron-11 compound, which structures may be exposed to nuclear radiation without outgassing or degradation and, so, are suitable for use in nuclear applications. By way of example only, such structures include components for nuclear reactors, such as control rods, control rod guides, fuel cladding, core support pedestals, reactor core blocks, upper core gas plenum, interior insulation covers, hot ducts, heat exchangers, and combinations thereof.

BRIEF DESCRIPTION OF THE SEVERAL VIEWS OF THE DRAWINGS

While the specification concludes with claims particularly pointing out and distinctly claiming that which is regarded as the present invention, the advantages of this invention may be more readily ascertained from the following description of the invention when read in conjunction with the accompanying drawings in which:

DETAILED DESCRIPTION OF THE INVENTION

A SiC material that is stable to irradiation is disclosed. A precursor formulation of the SiC material includes a ceramic material and at least one-boron compound having a $^{11}$B isotope (referred to herein as the "$^{11}$B compound"). Since $^{11}$B is a stable isotope, the SiC material having the $^{11}$B compound (referred to herein as the "$^{11}$B—SiC material") may be used to produce components stable to irradiation. These components may be used in the nuclear industry, such as in nuclear fission reactors and fusion reactors. An example of a fission reactor includes, but is not limited to, a GEN IV Very High Temperature Reactor. An example of a fusion reactor includes, but is not limited to, a Tokamak reactor. By using $^{11}$B in the boron compound, the $^{11}$B—SiC material does not undergo fission when irradiated. In addition, no outgassing or degradation occurs when the component is irradiated.

The precursor formulation of the $^{11}$B—SiC material includes the ceramic material and the $^{11}$B compound. Minor amounts of additional ingredients or additives may also be present in the precursor formulation, such as to improve processability of the precursor formulation or performance of the $^{11}$B—SiC material. However, these ingredients or additives are not needed to provide the desired stability of the $^{11}$B—SiC material to nuclear environments. The ceramic material in the precursor formulation may be converted to the $^{11}$B—SiC material by heating at a sufficient temperature in the presence of the $^{11}$B compound. The ceramic material may include silicon and carbon, which are present in near stoichiometric or moderately carbon-rich amounts. As used herein, the phrase "moderately carbon-rich" refers to a carbon content of less than or equal to approximately 2%. In one embodiment, the silicon and carbon are present in near stoichiometric amounts. The ceramic material may be amorphous or microcrystalline ceramic fibers that include sufficient silicon and carbon to form a $^{11}$B—SiC material that includes stoichiometric amounts of silicon and carbon or is carbon-rich. As used herein, the phrase "carbon-rich" refers to a carbon content of greater than approximately 2%. The ceramic fibers may also include oxygen ("O"), nitrogen ("N"), titanium ("Ti"), aluminum ("Al"), zirconium ("Zr"), or mixtures thereof. If present, these elements may volatilize out of the. $^{11}$B—SiC material during subsequent processing or remain in the $^{11}$B—SiC material without affecting its integrity or properties. Other elements may also be present in the ceramic fibers as long as the elements are volatilized or remain in the $^{11}$B—SiC material without affecting its integrity and properties. As described in more detail below, oxygen present in the ceramic material may, optionally, be removed (deoxygenated) before converting the ceramic material into the $^{11}$B—SiC material.

Methods of manufacturing the ceramic material used in the precursor formulation are known in the art and, therefore, are not discussed in detail herein. For instance, organosilicon polymers (with or without ceramic powder additives) may be spun into fibers, and the fibers cured (infusibilized) and pyrolyzed to form the ceramic material. In addition, sol-gel processing techniques or chemical vapor deposition techniques may be used to produce the ceramic material. The ceramic material used in the precursor formulation may have any length or any form desired. For instance, if fibers are used, the ceramic fibers may be substantially continuous and may be used as either single strands (or 1 or many filaments (tows)) or are aligned unidirectionally (e.g., tapes), woven as a 2-dimensional fabric or shaped as a 3-dimensional perform.

Examples of ceramic fibers that may be used include, but are not limited to, SiC fibers, silicon oxycarbide ("SiOC") fibers, silicon carbon nitride ("SiCN") fibers, silicon oxycarbonitride ("SiCON") fibers, or polytitanocarbosilane fibers ("SiCOTi"). In addition, mixtures of these ceramic fibers may be used. Such ceramic fibers are known in the art and are commercially available from various sources. For instance, SiOC fibers having a diameter in the range of from approximately 10 μm to approximately 20 μm are manufactured by Nippon Carbon Co. (Tokyo, Japan) and are sold under the NICALON® tradename (e.g., Ceramic Grade (CG), High Volume Resistivity (HVR)). SiCOTi fibers having a diameter in the range of from approximately 8 μm to approximately 12 μm are manufactured by Ube Industries, Ltd. (Yamaguchi, Japan) and are sold under the TYRANNO® tradename. Experimental ceramic fibers may also be used, such as SiCON fibers having a diameter in the range of from approximately 6 μm to approximately 10 μm and SiCON fibers having a diameter in the range of from approximately 10 μm to approximately 15 μm (produced by Dow Coming (Midland, Mich.) and designated as "MPDZ"). In one embodiment, the ceramic material includes SiOC fibers. In another embodiment, the ceramic material includes SiCOTi fibers, such as TYRANNO® Lox M fibers.

The $^{11}$B compound in the precursor formulation may function as a volatile, sintering aid. The B compound in the precursor formulation may initially melt and then volatilize to form a vapor. To achieve the desired properties in the $^{11}$B—SiC material, an excess amount of the $^{11}$B compound may be used relative to the amount of the ceramic material. As explained below, a small amount of the $^{11}$B compound may be present in the $^{11}$B—SiC material after processing of the precursor formulation to form the $^{11}$B—SiC material. The $^{11}$B compound may have a significant vapor pressure at and above a temperature at which the ceramic material begins to decompose or density. For the sake of example only, for SiCO ceramic fibers, the decomposition temperature may be as low as approximately 1200° C. for slow temperature heating (ramp) rates (e.g., <1° C./min) or may range from approximately 1400° C. to approximately 1500° C. for heating rates of several degrees per minute or more. The $^{11}$B compound may be a solid, a liquid, or a gas at room temperature.

The boron-11 compound may be a $^{11}$B isotope of boron oxide ("$^{11}$B$_2$O$_3$"), boron hydride ("$^{11}$B$_2$H$_6$"), boron hydroxide ("$_{11}$B(OH)$_3$"), boron carbide ("$^{11}$B$_4$C"), boron nitride ("$^{11}$BN"), boron chloride ("$^{11}$BCl$_3$"), boron fluoride ("BF$_3$"), boron metal, or mixtures thereof. In one embodiment, the $^{11}$B compound is $^{11}$B$_2$O$_3$. Compounds that include the $^{11}$B isotope are commercially available from various sources. For instance, $^{11}$B$_2$O$_3$ is available from Sigma-Aldrich Co. (St. Louis, Mo.) or EaglePicher Inc. (Phoenix, Ariz.). In addition, a mixture of two or more $^{11}$B compounds may be used in the precursor formulation.

The $^{11}$B compound may be present at less than or equal to approximately 2 wt % of a total weight of the precursor formulation, such as from approximately 0.5 wt % to approximately 1.5 wt % of the total weight of the precursor formulation. The amount of $^{11}$B compound used in the precursor formulation may be adjusted as long as crystallite growth and porosity are minimized such that the strength of the $^{11}$B-SIC material remains in an acceptable range. The remainder of the precursor formulation may include the ceramic material and any optional ingredients. As such, the ceramic material may account for greater than or equal to approximately 98 wt % of the total weight of the precursor formulation.

Alternatively, the $^{11}$B compound may be formed in situ by reacting a $^{11}$B-containing material with an oxidizing agent, as described in U.S. Pat. No. 6,261,509 to Barnard et al., which is incorporated by reference in its entirety herein. For instance, the $^{11}$B-containing containing material and the oxidizing agent may be reacted at a temperature that ranges from approximately 1300° C. to approximately 1600° C., producing $^{11}$B$_2$O$_3$ vapor. The $^{11}$B-containing material may include, but is not limited to, boron carbide ("B$_4$C"), boron, or boron suboxide ("B$_6$O"). The oxidizing agent may include, but is not limited to, carbon dioxide ("CO$_2$"), carbon monoxide ("CO"), oxygen ("O$_2$"), or mixtures thereof. When the $^{11}$B-containing material and oxidizing agent react, the oxidizing agent is the rate-limiting reagent. Therefore, the concentration of the oxidizing agent may be adjusted to control the concentration of vaporous $^{11}$B$_2$O$_3$ produced. In addition, the rate of addition of the oxidizing agent may be adjusted to control the production of vaporous $^{11}$B$_2$O$_3$. The amount of oxidizing agent reacted with the $^{11}$B-containing material may be sufficient to provide a $^{11}$B$_2$O$_3$ concentration sufficient to produce a minimum of 0.1 wt % of the $^{11}$B compound in the resulting $^{11}$B—SiC material.

To produce the precursor formulation of the $^{11}$B—SiC material, the ceramic material may be doped with the $^{11}$B compound and densified, such as by heating the ceramic material in an environment or atmosphere that includes the $^{11}$B compound. The ceramic material and the $^{11}$B compound may be heated at a temperature sufficient to convert the ceramic material to a polycrystalline SiC material. While the $^{11}$B compound is in a volatile state during the doping and densification, the $^{11}$B compound may be a solid, a liquid, or a gas at room temperature. If the $^{11}$B compound is a solid or a liquid at room temperature, the $^{11}$B compound may be placed in a furnace or other heat source with the ceramic material. The ceramic material and the $^{11}$B compound may be mixed together or placed separately in the furnace and volatilized under the heat of the furnace so that the ceramic material is doped with the 11B compound. Alternatively, the $^{11}$B compound in a solid or liquid state may be volatilized outside the furnace and introduced to the furnace in the vaporous or gaseous form. If the $^{11}$B compound is in a gaseous state at room temperature, the $^{11}$B compound may be flowed over the ceramic material in the furnace. The $^{11}$B compound may be used in the furnace neat, diluted in a carrier gas (e.g. an inert gas, such as argon, helium, etc.), or added under a vacuum.

The ceramic material may be heated in the presence of the $^{11}$B compound at a temperature sufficient to convert the ceramic material to the $^{11}$B—SiC material. During the heating, the $^{11}$B compound may diffuse into the ceramic material. The temperature needed to densify the ceramic material may be greater than approximately 1400° C., such as from approximately 1600° C. to approximately 2200° C. In one embodiment, the temperature ranges from approximately 1700° C. to approximately 2000° C. The temperature used to convert the ceramic material to the $^{11}$B—SiC material should be at least equivalent to the temperature expected in any subsequent processing and/or the final utility of the $^{11}$B—SiC material. As the ceramic material is heated, volatile by-products may form and should be released from the ceramic material. A rate at which the ceramic material and the $^{11}$B compound are heated and a hold time (hold) at a maximum temperature during the heating may be adjusted as long as the heating rate and the hold time enable the $^{11}$B compound to diffuse into the ceramic material and the volatile by-products to evolve. For the sake of example only, the heating rate may range from approximately 1° C./minute to approximately 50° C./minute, with either no hold or a hold time of up to approximately several hours. However, a total thermal exposure of the ceramic material, which depends on the heating rate, maximum temperature, and the time at the maximum temperature, may affect characteristics and properties of the $^{11}$B—SiC material, such as modulus and grain growth. For example, the properties of the $^{11}$B—SiC material may be optimized after exposure that ranges from approximately 5 minutes to approximately 10 minutes in the case of 10 µm diameter fibers, which may equilibrate quickly. However, longer exposure times, on the order of many hours, may be used for a $^{11}$B—SiC material having a more substantial diameter.

The ceramic material may be heated with the $^{11}$B compound for an amount of time sufficient to achieve the desired densification of the ceramic material. For instance, the ceramic material may be exposed to the $^{11}$B compound during the entire heat treatment (to convert the ceramic material to the $^{11}$B—SiC material) after the ceramic material begins to decompose or densify. Alternatively, the ceramic material may be maintained at a temperature at or above its decomposition or densification temperature in an atmosphere that includes the $^{11}$B compound for an amount of time sufficient to enable the $^{11}$B compound to incorporate into the ceramic material. The ceramic material may then be further heated in the absence of the $^{11}$B compound to complete the densification process. Without being bound to a theory, the $^{11}$B in the $^{11}$B compound may limit grain growth of the ceramic material and aid in densifying the ceramic material, which is believed to decrease porosity of the $^{11}$B—SiC material. The $^{11}$B compound may be incorporated into a conventional fiber manufacturing approach and the production of the $^{11}$B—SiC material may be run in batches or on a continuous production line.

If the ceramic material to be used in the precursor formulation includes oxygen, the ceramic material may, optionally, be deoxygenated before doping and densification. For instance, the ceramic material may be heated to a temperature greater than or equal to approximately 1300° C. to remove the oxygen, such as a temperature that ranges from approximately 1300° C. to approximately 1600° C. The oxygen may volatilize out of the ceramic material as silicon oxide ("SiO") or carbon monoxide ("CO"). By removing the oxygen, the ceramic material used in the precursor formulation may not be limited to a ceramic material having a low oxygen content, which expands the types of ceramic materials that may be used. After deoxygenating the ceramic material, the precursor formulation may be doped and densified as described above.

After doping and densifying the precursor formulation, the resulting $^{11}$B—SiC material may have at least approximately 0.1 wt % of the $^{11}$B compound incorporated therein. For instance, the $^{11}$B—SiC material may include from at least approximately 0.1 wt % of the $^{11}$B compound to approximately 4 wt % of the $^{11}$B compound, such as from approximately 0.3 wt % of the $^{11}$B compound to approximately 2.5 wt % of the $^{11}$B compound.

The $^{11}$B—SiC material may have substantially similar properties to SiC fibers produced from a formulation that includes a $^{11}$B compound as the sintering aid. For instance, the $^{11}$B—SiC material may have properties that are substantially similar to those of SYLRAMIC® fibers. The $^{11}$B—SiC material may be high-strength, beat resistant, and corrosion resistant. In addition, the $^{11}$B—SiC material may have at least 75% crystallinity and a density of at least approximately 2.9 g/cm$^3$. Any oxygen or nitrogen that was initially present in the ceramic material may be absent in the $^{11}$B—SiC material, producing a $^{11}$B—SiC material having a low residual oxygen content or a low residual nitrogen content. The $^{11}$B—SiC material may also have an average grain size of less than approximately 1 μm, such as less than approximately 0.5 μm or less than approximately 0.2 μm. The diameter of the $^{11}$B—SiC material may range from approximately 5 μm to approximately 20 μm, depending on the diameter of the ceramic fibers initially used in the precursor formulation. In addition, the $^{11}$B—SiC material may have a tensile strength of at least approximately 2,070 MPa, such as at least approximately 2,760 MPa. The $^{11}$B—SiC material may also have an elastic modulus that is greater than or equal to approximately 275 GPa, such as an elastic modulus that ranges from approximately 323 GPa to approximately 483 GPa.

After densifyng, a sizing may, optionally, be applied to the $^{11}$B—SiC material, as known in the art. The $^{11}$B—SiC material may then be wound onto spools or otherwise stored until the $^{11}$B—SiC material is to be shaped or produced into a product or component. For the sake of example only, the $^{11}$B—SiC material may be formed into tows (yams) that include approximately 800 filaments. The tows may be continuous filaments of the $^{11}$B—SiC material and may have a diameter of approximately 10 μm and a length of approximately 1000 m. The tows may be woven into fabrics and formed into components, such as nuclear reactor components. The $^{11}$B—SiC material may be formed into the nuclear reactor component in the same manner as conventional SiC fibers. Since methods of forming nuclear reactor components from conventional SiC materials are known in the art, these methods are not discussed in detail herein.

Figure 1:
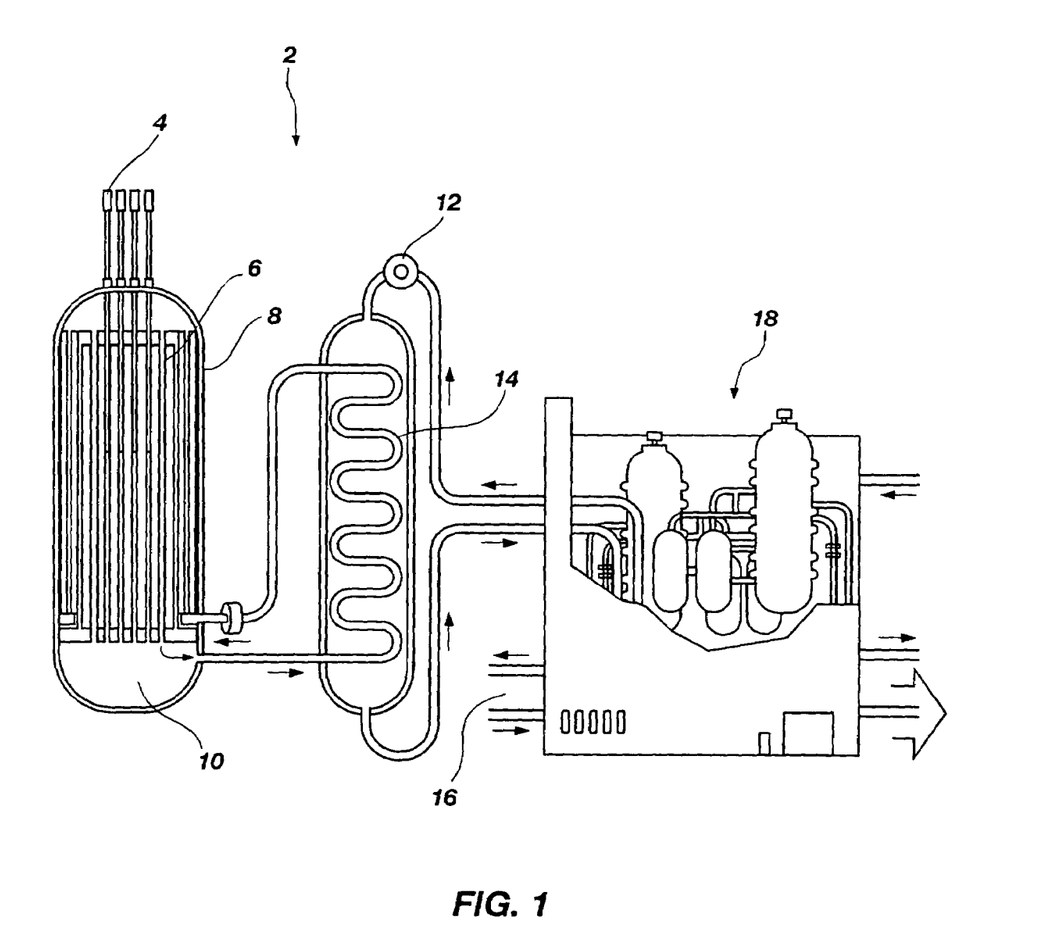
FIG. 1 is a schematic illustration of a very high temperature nuclear reactor.
Figure 2:
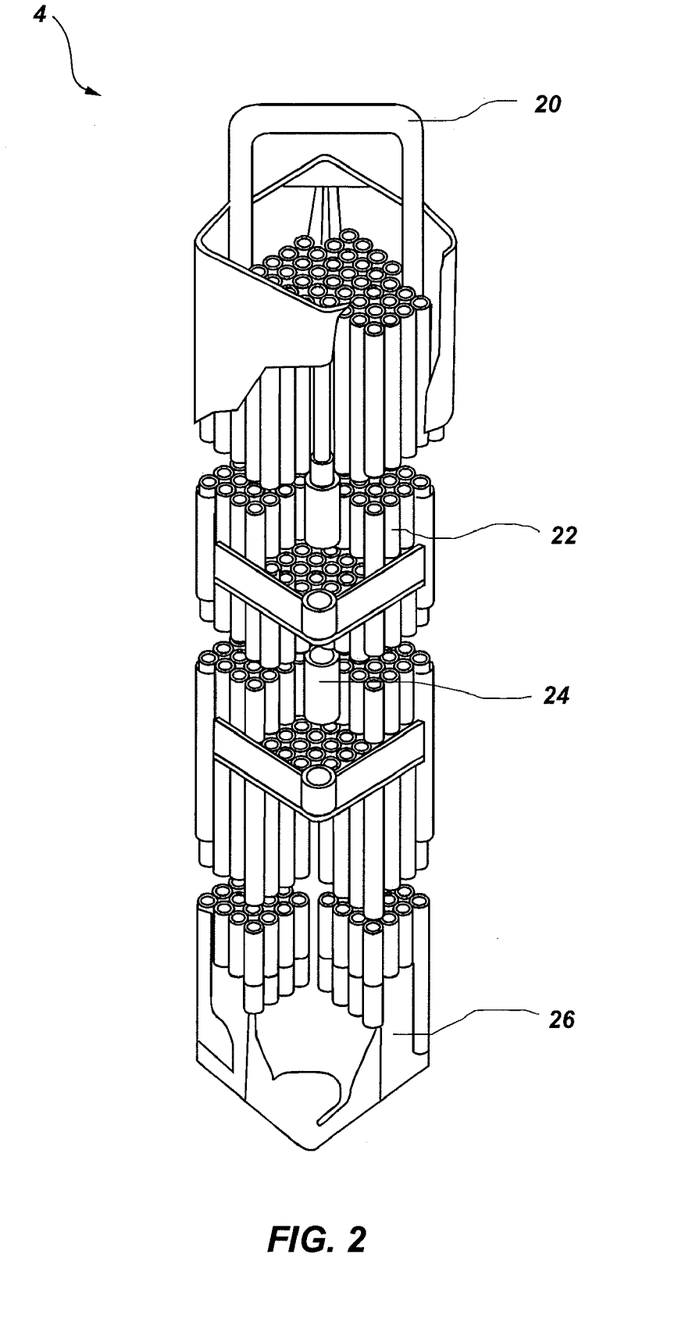
FIG. 2 is a schematic illustration of a control rod.
Figure 3:
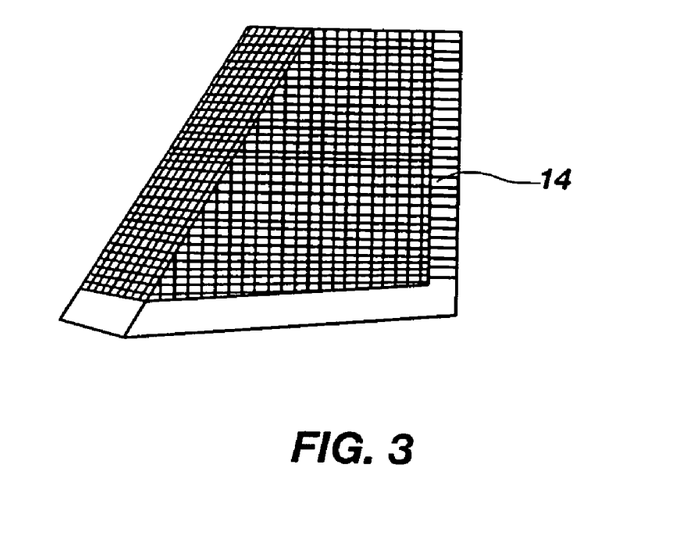
FIG. 3 illustrates an embodiment of a heat exchanger formed from the $^{11}$B—SiC material of the present invention.
Figure 4:
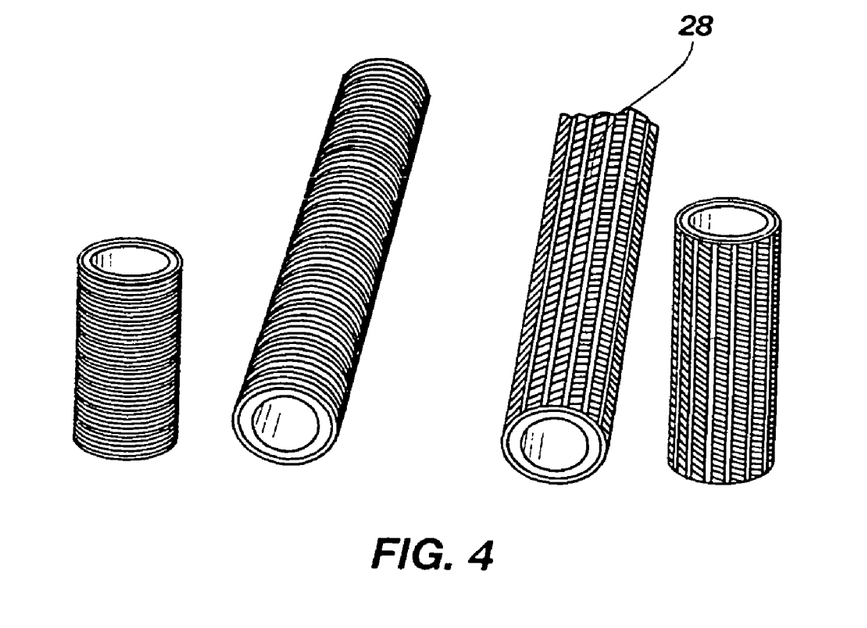
FIG. 4 illustrates an embodiment of fuel cladding formed from the $^{11}$B—SiC material of the present invention.

The $^{11}$B—SiC material may be formed into a component for use in a nuclear reactor or in other nuclear application. Examples of components include, but are not limited to, control rods, control rod guides, fuel cladding, core support pedestals, reactor core blocks, upper core gas plenum, interior insulation covers, hot ducts, heat exchangers, or combinations thereof. A nuclear reactor 2 is schematically illustrated in FIG. 1. The nuclear reactor 2 includes control rods 4, a reactor core 6, a reflector 8, a coolant 10, a pump 12, a heat exchanger 14, and a heat sink 16. The control rods 4 or the heat exchanger 14 may be formed from the $^{11}$B—SiC material. As known in the art, the nuclear reactor 2 may be connected to a hydrogen production plant 18. A close-up view of a control rod 4 is shown in FIG. 2. The control rod 4 includes an upper tie plate 20, a uranium dioxide pellet 22, a water rod 24, and a lower tie plate 26. FIG. 3 illustrates a heat exchanger 14 formed from the $^{11}$B—SiC material. FIG. 4 shows fuel cladding 28 formed from the $^{11}$B—SiC material.

The component formed from the $^{11}$B—SiC material may be heat resistant (able to withstand temperatures of greater than or equal to approximately 1400° C.) and have a high resistance to nuclear irradiation. When irradiated, the component may not undergo outgassing or degradation since $^{11}$B is more stable to irradiation than $^{10}$B and does not undergo fission. As such, the component formed from the $^{11}$B—SiC material may be used in a high temperature, corrosive, irradiative environment. Using $^{11}$B instead of $^{10}$B also does not significantly increase the expense of the $^{11}$B—SiC material because the cost of $^{11}$B is only slightly greater than that of $^{10}$B. Additionally, since $^{11}$B is chemically identical to $^{10}$B, special equipment or additional processing steps are not needed.

Before shaping or producing the $^{11}$B—SiC material into the product or component, the $^{11}$B—SiC material may, optionally, be subject to an in situ boron nitride ("i$^{11}$BN") treatment. The $^{11}$B—SiC material may be heated in a nitrogen atmosphere, enabling an excess of the $^{11}$B compound that remains at a surface of the $^{11}$B—SiC material to react with the nitrogen. The $^{11}$B—SiC material may be heated at a temperature that ranges from approximately 1750° C. to approximately 1950° C., such as at a temperature of approximately 1800° C. The $^{11}$B compound may react with the nitrogen to form a $^{11}$BN layer on the surface of the $^{11}$B—SiC material. The $^{11}$BN layer is oxidation resistant and provides an environmentally durable surface and a physical barrier to the $^{11}$B—SiC material. The remainder of the $^{11}$B compound in the $^{11}$B—SiC material may form grain boundary precipitates, specifically as titanium diboride ("TiB$_2$"). Removing the excess $^{11}$B compound may maintain the high tensile strength of the $^{11}$B—SiC material and improves its creep resistance, electrical conductivity, and thermal conductivity. The treated, $^{11}$B—SiC material may also have improved rupture strength at high temperatures in air.

The following examples serve to explain embodiments of the $^{11}$B—SiC material in more detail. These examples are not to be construed as being exhaustive or exclusive as to the scope of the invention.

EXAMPLES

Example 1

Formation of $^{11}$B-Doped SiC Fibers

TYRANNO® Lox M fibers were obtained from Ube Industries, Ltd. and solid $^{11}$B$_2$O$_3$ was obtained from EaglePicher, Inc. The TYRANNO® Lox M fibers are polymer-derived, Si—Ti—C—O fibers having reduced oxygen content. To deoxygenate the TYRANNO® Lox M fibers in a batch operation, 800 g of TYRANNO® Lox M fibers were placed onto four Grafoil spool packages and placed in a furnace with 108 g of $^{11}$B$_2$O$_3$ powder in several Grafoil boats in flowing argon at approximately 1600° C. for approximately 5 hours. The TYRANNO® Lox M fibers and the $^{11}B_2O_3$ powder were then heated at approximately 1650° C. for approximately 1.5 hours to enable doping of the TYRANNO® Lox M fibers with boron. The TYRANNO® Lox M fibers lost approximately 20% of their weight during the doping operation. The fiber spool was then removed from the furnace.

In a second, separate, operation, the doped fibers described above were densified in a continuous spool-to-spool operation by exposing the doped TYRANNO® Lox M fibers to a temperature of approximately 1650° C. in flowing argon for approximately 15 seconds. Upon densification, the doped TYRANNO® Lox M fibers were converted to $^{11}B$—SiC fibers. The $^{11}B$—SiC fibers lost no weight during this second operation. At this stage, the fibers had a typical filament diameter of 8.5 μm, a density of 3.14 g/cm³, a tensile strength of 2714 MPa and an elastic modulus of 289 GPa.

In a third, separate operation, a sizing was placed on the $^{11}B$—SiC fibers by applying a 0.5 wt % aqueous solution of polyvinylalcohol at a level of 0.1 wt %. The $^{11}B$—SiC fibers were then cured at 300° C., producing continuous $^{11}B$—SiC fibers approximately 10 μm in diameter and approximately 1000 meters in length. The $^{11}B$—SiC fibers were wound onto spools for storage as tows (yarn) of 800 filaments.

Example 2

$^{11}B$-Doped SiC Fibers Exposed to iBN Treatment

Approximately 800 g of $^{11}B$—SiC fibers from Example 1 were wound onto a Grafoil spool and placed into a furnace. The furnace was heated to approximately 1850° C. for approximately 1.5 hours in a controlled flowing nitrogen gas. During this process, the nitrogen gas diffused into the SiC fiber surface and reacted with the $^{11}B$ that was present, forming a thin, $^{11}BN$-rich, in-situ layer at the near fiber surface. Auger analysis showed that the 11BN-rich, in-situ layer was approximately 200 nm in thickness. The resulting $i^{11}BN$ SiC fibers had a density of 3.14g/cm³, a tensile strength of 2411 MPa and an elastic modulus of 324 GPa.

Properties of the $^{11}B$—SiC fibers described in Example 1 and the $i^{11}N$ SiC fibers described in Example 2 are shown in Table 1. For comparison, the properties of $^{10}B$-doped SiC fibers (SYLRAMIC® fibers, commercially available from COI Ceramics, Inc.) are also provided. These properties were determined by conventional techniques.

| Property | $^{11}B$-Doped SiC Fibers | $^{11}B$-Doped SiC Fibers Exposed to iBN treatment | $^{10}B$-Doped SiC Fibers |
|---|---|---|---|
| Denier (g/9000 m) | 1605 | 1605 | 1475-1750 |
| Density (g/cm³) | 3.14 | 3.14 | 3.12 |
| Diameter (μm) | 8-10 | 8-10 | 8-10 |
| Oxygen (wt %) | 0.02 | 0.01 | 0.02 |
| Tensile Strength (MPa) | 2700 | 2600 | >2067 |
| Tensile Modulus (GPa) | 310 | 290 | >276 |

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A precursor formulation of a silicon carbide material, comprising:
   a ceramic material comprising silicon and carbon; and
   a sintering aid consisting of a boron-11 isotope of boron oxide.

2. The precursor formulation of claim 1, wherein the ceramic material comprises silicon and carbon in stoichiometric amounts or in carbon-rich amounts.

3. The precursor formulation of claim 1, wherein the ceramic material further comprises oxygen, nitrogen, titanium, zirconium, aluminum, or mixtures thereof.

4. The precursor formulation of claim 1, wherein the ceramic material comprises silicon carbide fibers, silicon oxycarbide fibers, silicon carbon nitride fibers, silicon oxycarbonitride fibers, polytitanocarbosilane fibers, or mixtures thereof.

5. The precursor formulation of claim 1, wherein the boron-11 isotope of boron oxide is a solid, a liquid, or a gas at room temperature.

6. The precursor formulation of claim 1, wherein the boron-11 isotope of boron oxide comprises less than or equal to approximately 2% by weight of a total weight of the precursor formulation.

7. The precursor formulation of claim 1, wherein the boron-11 isotope of boron oxide comprises from approximately 0.5% by weight of a total weight of the precursor formulation to approximately 1.5% by weight of the total weight of the precursor formulation.

8. A precursor formulation of a silicon carbide material, comprising:
   a sintering aid incorporated in a silicon and carbon material, the sintering aid consisting of a boron-11 isotope of boron oxide.

* * * * *

UNITED STATES PATENT AND TRADEMARK OFFICE
CERTIFICATE OF CORRECTION

PATENT NO. : 7,700,202 B2  Page 1 of 1
APPLICATION NO. : 11/357716
DATED : April 20, 2010
INVENTOR(S) : Timothy E. Easler, Andrew Szweda and Eric Stein It is certified that error appears in the above-identified patent and that said Letters Patent is hereby corrected as shown below:

On the title page:
In ITEM (73) Assignee: Delete "Alliant Techsystems Inc., Minneapolis, MN (US)" and replace with --COI Ceramics, Inc., San Diego, CA (US)--

Signed and Sealed this
Eighteenth Day of January, 2011

David J. Kappos
*Director of the United States Patent and Trademark Office*